(12) United States Patent
Park et al.

(10) Patent No.: US 11,972,082 B2
(45) Date of Patent: Apr. 30, 2024

(54) TOUCH CONTROL CIRCUIT AND DISPLAY DEVICE INCLUDING THE SAME

(71) Applicant: LX Semicon Co., Ltd., Daejeon (KR)

(72) Inventors: Young Ju Park, Daejeon (KR); Young Eun Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/089,357

(22) Filed: Dec. 27, 2022

(65) Prior Publication Data

US 2023/0205380 A1    Jun. 29, 2023

(30) Foreign Application Priority Data

Dec. 28, 2021    (KR) .......................... 10-2021-0189132

(51) Int. Cl.
*G06F 3/044*    (2006.01)
*G02F 1/1333*    (2006.01)
*G06F 3/041*    (2006.01)

(52) U.S. Cl.
CPC ........ *G06F 3/0446* (2019.05); *G02F 1/13338* (2013.01); *G06F 3/0412* (2013.01); *G06F 3/04162* (2019.05)

(58) Field of Classification Search
CPC .............. G06F 3/0412; G06F 3/04162; G06F 3/04166; G06F 3/0418; G06F 3/04186; G06F 3/0443; G06F 3/0446
See application file for complete search history.

(56) References Cited

U.S. PATENT DOCUMENTS

| 2015/0227310 | A1  | 8/2015  | Imai et al.           |
|--------------|-----|---------|-----------------------|
| 2018/0181787 | A1* | 6/2018  | Jee ............ G06V 40/1306 |
| 2020/0371661 | A1  | 11/2020 | Hung et al.           |

FOREIGN PATENT DOCUMENTS

KR    10-2388990 B1    4/2022

* cited by examiner

*Primary Examiner* — Robin J Mishler
(74) *Attorney, Agent, or Firm* — POLSINELLI PC

(57) ABSTRACT

The present disclosure relates to a technology for sensing a touch input by differently adjusting a ratio of a threshold for each touch location, and can provide a technology for incorporating a difference between touch sensing sensitivity at the center of a touch area and touch sensing sensitivity in the periphery of the touch area by setting a threshold by incorporating a ratio of touch intensity at an offset location and touch intensity at an adjacent location.

8 Claims, 10 Drawing Sheets

TOUCH CONTROL CIRCUIT AND DISPLAY DEVICE INCLUDING THE SAME

CROSS-REFERENCE TO RELATED APPLICATION

This application claims the priority of Korean Patent Application No. 10-2021-0189132 filed on Dec. 28, 2021, which is hereby incorporated by reference in its entirety.

BACKGROUND

Field of the Disclosure

The present disclosure relates to a touch control circuit and a display device including the same.

Description of the Background

A technology for recognizing an external object that touches a touch panel or becomes close to the touch panel is called a touch sensing technology. The display panel is placed on the same location as the touch panel on a plane. Accordingly, a user may input a user manipulation signal to the touch panel while watching an image on the touch pane. Such a method of generating a user manipulation signal provides excellent user intuitiveness compared to a previous user manipulation signal input method, for example, a mouse input method or a keyboard input method.

Due to such an advantage, the touch sensing technology is applied to various electronic devices including a panel. For example, a touch circuit may supply a driving signal to a driving electrode that is disposed in the touch panel, and may sense the touch or proximity of an external object for the touch panel by receiving a response signal that is formed in a sensing electrode. A touch panel generates capacitance between a touch driving electrode and a touch sensing electrode. A change in the capacitance may indicate the touch or proximity of an external object.

In order for the touch circuit to determine the touch or proximity of an object, when the touch circuit receives touch data corresponding to a change in capacitance and the touch data has a size equal to or greater than a threshold, the touch circuit may determine the touch or proximity of the object has occurred.

There may be a difference in touch sensing sensitivity depending on a location of a touch electrode disposed in the touch circuit or a location within the touch electrode. In order to improve a touch recognition ratio of the touch circuit, it is necessary to improve such a difference in the touch sensitivity for each location.

The above information disclosed in this Background section is only for enhancement of understanding of the background of the described technology and therefore it may contain information that does not form prior art that is already known to a person of ordinary skill in the art.

SUMMARY

Accordingly, the present disclosure is to provide a touch control circuit capable of compensating for a touch sensitivity deviation for each location of a touch area and a display device including the same.

More specifically, the present disclosure is to provide a touch control circuit capable of recognizing the ground state and non-ground state of a display device by distinguishing between the ground state and the non-ground state and adjusting touch sensitivity by incorporating the state of the display device, and a display device including the same.

In addition, the present disclosure is to provide a touch control circuit capable of reducing a computational load of data occurring in a touch calculation process and improve an operating speed by forming a lookup table by using previously measured touch data and adjusting the ratio of thresholds for each touch area, and a display device including the same.

To achieve these and other advantages and in accordance with the present disclosure, as embodied and broadly described, a touch control circuit, including a touch detection circuit configured to determine that a touch for a panel has occurred when a change in capacitance of each location of a touch electrode disposed in the panel is equal to or greater than a threshold, an offset determination circuit configured to determine an offset location among locations at which the touch has occurred, a threshold compensation ratio determination circuit configured to obtain a threshold compensation ratio for each distance on the basis of the offset location, and a final threshold determination circuit configured to determine a final threshold by compensating for the threshold based on the threshold compensation ratio, wherein the touch detection circuit determines whether the touch has occurred and a touch location of the panel based on the final threshold.

In another aspect of the present disclosure, a touch circuit, including a readout circuit configured to receive touch data corresponding to a change in capacitance of a touch electrode disposed in a panel and a touch control circuit configured to receive the touch data from the readout circuit and determine that a touch for the panel has occurred when the touch data is equal to or greater than a threshold, wherein the touch control circuit differently sets the threshold for each location of the touch electrode.

In still another aspect of the present disclosure, a touch sensing method, including obtaining touch data for each location of one touch area of a panel, determining an offset location in the touch area and determining a threshold compensation ratio based on a change ratio of the touch data for each distance of the offset location, and calculating a final threshold by applying the threshold compensation ratio to a preset threshold, and determining whether a touch for the panel has occurred based on the final threshold.

As described above, according to the present disclosure, a touch malfunction can be prevented and touch performance can be improved by compensating for a touch sensitivity deviation for each location of a touch area in a panel.

Furthermore, according to the present disclosure, the ground state and non-ground state of a display device can be distinguished and recognized, and touch sensitivity can be optimized by incorporating the state of the display device.

Furthermore, according to the present disclosure, a computational load of data occurring in a touch calculation process can be reduced and an operating speed can be improved by forming a lookup table by using previously measured touch data and adjusting the ratio of thresholds for each touch area.

Furthermore, the present disclosure can provide a system for dynamically managing a touch threshold based on the center of a touch when the touch has performed in a small area.

It is to be understood that both the foregoing general description and the following detailed description are exemplary and explanatory and are intended to provide further explanation of the disclosure as claimed.

BRIEF DESCRIPTION OF THE DRAWINGS

It is to be understood that both the foregoing general description and the following detailed description are exemplary and explanatory and are intended to provide further explanation of the disclosure as claimed.

In the drawings.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Figure 1:
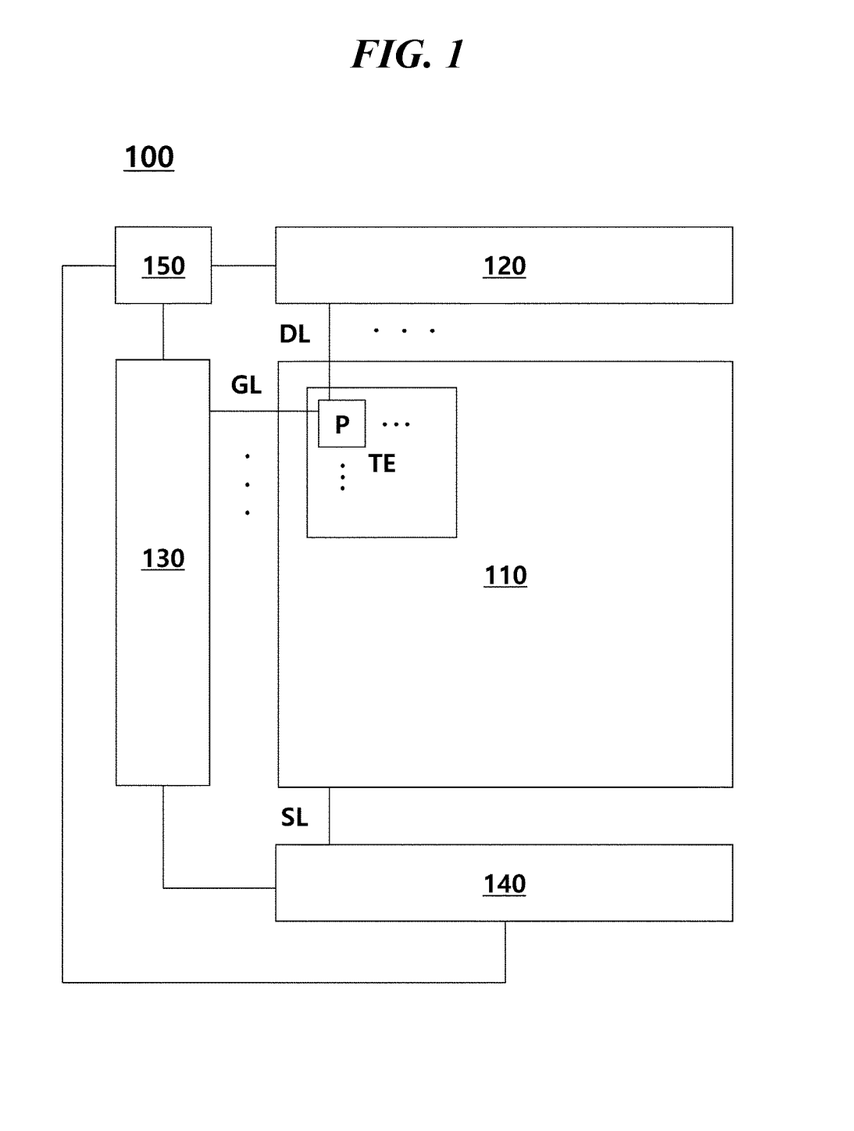
FIG. 1 is a construction diagram of a display device according to the present disclosure.

FIG. 1 is a construction diagram of a display device according to the present disclosure.

Referring to FIG. 1, a display device 100 may include a panel 110, a data driving circuit 120, a gate driving circuit 130, a touch circuit 140, a touch/display control circuit 150, etc.

A plurality of data lines DL connected to the data driving circuit 120 may be formed in the panel 110. A plurality of gate lines GL connected to the gate driving circuit 130 may be formed in the panel 110. Furthermore, multiple pixels P corresponding to points at which the plurality of data lines DL and the plurality of gate lines GL intersect may be defined in the panel 110.

A transistor whose first electrode (e.g., a source electrode or a drain electrode) is connected to the data line DL, whose gate electrode is connected to the gate line GL, and whose second electrode (e.g., a drain electrode or a source electrode) connected to a display electrode may be formed in each pixel P.

Furthermore, a plurality of touch electrodes TE may be spaced apart from each other and further formed in the panel 110. One pixel P may be disposed or multiple pixels P may be disposed in an area in which the touch electrode TE is disposed.

The panel 110 may include a display panel and a touch panel (touch screen panel (TSP)). In this case, the display panel and the touch panel may share some components thereof. For example, a plurality of touch electrodes TE may be one component (e.g., a common electrode that applies a common voltage) of the display panel and may also be one component (a touch electrode for sensing a touch) of the touch panel. Furthermore, the panel 110 may be an in-cell type panel as a form in which some components of the display panel and the touch panel are shared, but the present disclosure is not limited thereto.

The data driving circuit 120 may receive a data control signal of the touch/display control circuit 150, and may supply a data signal to the data line DL in order to display an image in each pixel P of the panel 110.

The gate driving circuit 130 receives a gate control signal of the touch/display control circuit 150, and sequentially supplies a scan signal to the gate line GL in order to turn on or off the transistor disposed in each pixel P.

The touch circuit 140 may apply a touch driving signal to some or all of the plurality of touch electrodes TE connected to respective sensing lines SL.

In order for the touch circuit 140 to apply the touch driving signal to some or all of the plurality of touch electrodes TE, there is a need for the sensing lines SL connected to the plurality of touch electrodes TE. Accordingly, the sensing lines SL that are connected to the plurality of touch electrodes TE and that transfer the touch driving signal may be formed in the panel 110 in a first direction (e.g., a longitudinal direction) or a second direction (e.g., a transverse direction).

The display device 100 may adopt a capacitive type touch method of recognizing the touch or proximity of an object by sensing a change in capacitance through the touch electrode TE. The capacitive type touch method may include a mutual capacitance touch method and a self-capacitance touch method. The present disclosure may apply a given capacitive type touch method.

The display device 100 may drive the touch electrode TE in a time-division way by distinguishing between a display time interval and a touch time interval. For example, the touch circuit 140 of the display device 100 may not apply a driving signal to some or all of the touch electrodes TE in the interval in which a data signal is supplied.

Furthermore, the display device 100 may drive the touch electrode TE without distinguishing between the display interval and the touch interval. For example, the touch circuit 140 of the display device 100 may apply a driving signal to some or all of the touch electrodes TE in the interval in which a data signal is supplied.

The touch/display control circuit 150 may supply various control signals to the data driving circuit 120, the gate driving circuit 130, and the touch circuit 140. The touch/display control circuit 150 may transmit a data control signal DCS that controls the data driving circuit 120 to supply a data voltage to each pixel P based on each piece of timing, may transmit a gate control signal GCS to the gate driving circuit 130, or may transmit a sensing signal to the touch circuit 140. The touch/display control circuit 150 may be a timing controller (T-Con) or may include the timing controller and further perform another control function.

Figure 2:
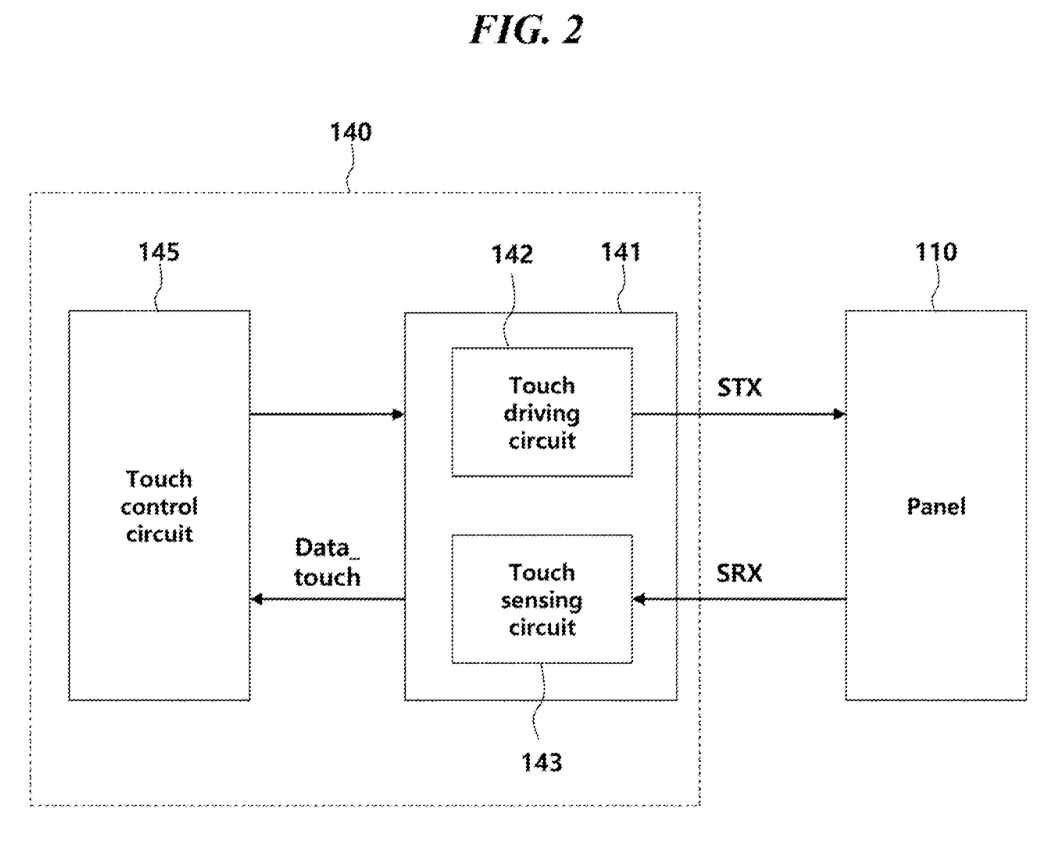
FIG. 2 is a construction diagram of a touch circuit according to the present disclosure.

FIG. 2 is a construction diagram of a touch circuit according to the present disclosure.

Referring to FIG. 2, the touch circuit 140 may include a readout circuit 141, a touch control circuit 145, etc.

The readout circuit 141 may include a touch driving circuit 142 and a touch sensing circuit 143. The touch circuit 140 may transmit a touch driving signal STX to the touch electrode TE of the panel 110 through the touch driving circuit 142, and may receive a touch sensing signal SRX from the touch electrode TE through the touch sensing circuit 143.

The readout circuit 141 may receive the touch sensing signal SRX having a size corresponding to a change in capacitance in a current or voltage form, may generate touch data Data_touch by demodulating the touch sensing signal SRX, and may transmit the touch data Data_touch to the touch control circuit 145.

The touch control circuit 145 may determine the touch or proximity of an object 10 for the panel 110 by receiving the touch data, and may control an operation of the readout circuit 141. The touch control circuit 145 may be defined as a touch micro-controller unit (TMCU) or a touch processor.

The touch driving circuit 142 of the readout circuit 141 may transmit an uplink signal UL to a stylus pen through a touch electrode. When the stylus pen touches the panel 110 including the touch electrode or approaches the panel 110 within a given distance, the stylus pen may receive the uplink signal UL. The uplink signal UL may be transmitted from a part of or the entire panel 110 to the stylus pen.

The touch sensing circuit 143 of the touch circuit 140 receive a downlink signal DL from the stylus pen through a touch electrode. The downlink signal DL may be transmitted to the touch electrode located at a location at which the stylus pen is touched or approaches.

The touch circuit 140 may determine whether a touch of an object has occurred, a touch location of the panel, touch intensity, or a touch interval based on a change in capacitance of a touch electrode according to the touch or proximity of the object.

Figure 3:
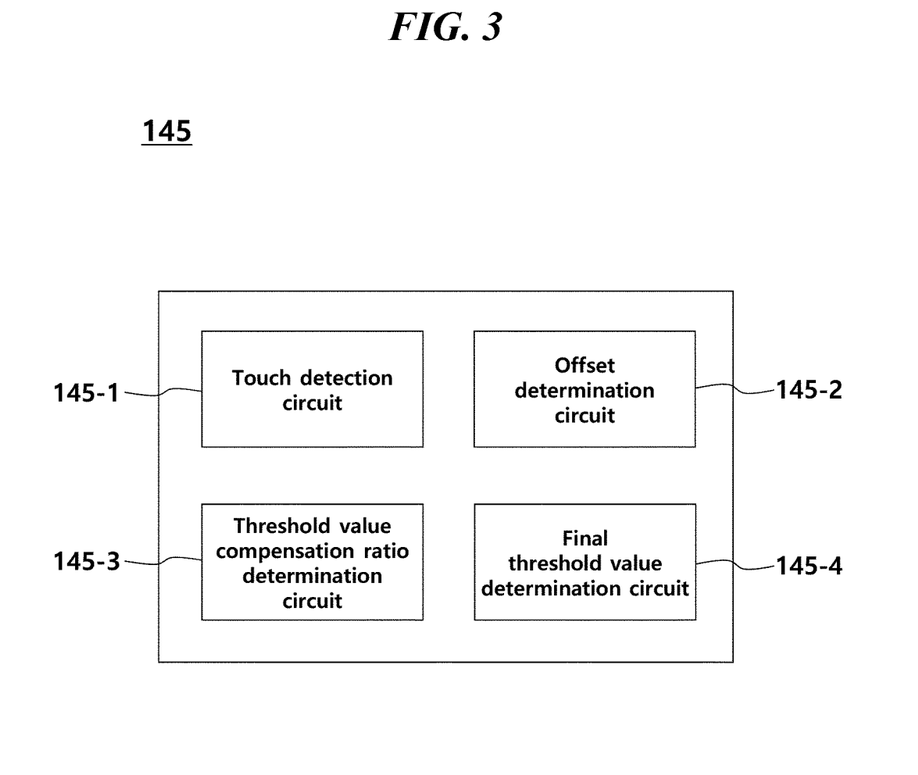
FIG. 3 is a construction diagram of a touch control circuit according to the present disclosure.

FIG. 3 is a construction diagram of a touch control circuit according to the present disclosure.

Referring to FIG. 3, the touch control circuit 145 may include a touch detection circuit 145-1, an offset determination circuit 145-2, a threshold compensation ratio determination circuit 145-3, and a final threshold determination circuit 145-4.

The touch detection circuit 145-1 may determine that a touch of an object has occurred based on touch data transferred by the readout circuit when the touch data is equal to or greater than a threshold. The touch detection circuit 145-1 may determine whether a touch of an object for the panel has occurred and a touch location of the panel by taking into consideration a correlation between a change in the touch data and a change in capacitance for each location of the touch electrode TE disposed in the panel.

The touch detection circuit 145-1 may determine whether a touch of an object for the panel has occurred and a touch location of the panel by using various touch sensors having a diamond shape and a dot shape within the panel. For example, the touch detection circuit 145-1 may define a touch area of an object based on the size of a signal from a touch sensor or may determine touch intensity, a touch location of the panel, etc. based on touch data of adjacent touch sensors.

The touch detection circuit 145-1 may determine a touch area equal to or greater than a preset reference area as a finger touch and a touch area smaller than the reference area as a pen touch.

The touch detection circuit 145-1 may differently set a threshold in the ground state of the display device and a threshold in the non-ground state of the display device, and may store the thresholds in a separate lookup table. In the ground state, the threshold may be set to be high because touch sensitivity is high. In the non-ground state, the threshold may be set to be low because touch sensitivity is low.

The touch detection circuit 145-1 may adjust the threshold of the ground state or the non-ground state, and may recognize that a touch of an object has been activated or a touch input is valid when a touch signal equal to or greater than the threshold continues for a given time or more.

Furthermore, the touch detection circuit 145-1 can improve data operation efficiency by storing the threshold for detecting a touch therein in the form of the lookup table or the threshold in external memory (not illustrated) and using the threshold.

The offset determination circuit 145-2 may determine an offset location among locations at which a touch of an object has occurred. The offset location may be a given one point or area of a valid touch area.

For example, when a plurality of touch electrodes is simultaneously touched, a given one touch electrode may be set as an offset location. When the one touch electrode is touched, a given one point may be set as an offset location.

Furthermore, when a plurality of touch electrodes is simultaneously touched, an offset location may be set in each of the plurality of touch electrodes. In this case, one offset ratio may be calculated, and a computational load can be reduced by applying the one offset ratio to each of the plurality of touch electrodes.

A central part of a touch area may be determined as an offset location because the central part may have higher touch sensitivity and an outskirts part of the touch area may have lower touch sensitivity. Since a touch valid ratio may be decreased toward the outskirts of the touch area, higher touch strength for each location may be recognized at the central part of the touch area although touches have the same intensity.

A reference point for calculation may be provided by calculating a change in touch intensity or a change in a threshold based on the touch intensity of an offset location or the threshold.

The threshold compensation ratio determination circuit 145-3 may obtain a threshold compensation ratio for each distance on the basis of the offset location.

The threshold compensation ratio determination circuit 145-3 may obtain a touch intensity distribution for each location or distance on the basis of an offset location, and may obtain a threshold compensation ratio corresponding to the touch intensity distribution for each location or distance.

As the distance is increased on the basis of the offset location, touch intensity may be decreased, and the threshold compensation ratio may also be set to be proportional to the touch intensity decrease ratio.

The threshold compensation ratio determination circuit 145-3 may calculate a threshold compensation ratio of the panel in a first direction, for example, in an x axis direction and a threshold compensation ratio of the panel in a second direction, for example, in a y axis direction. For example, when the threshold compensation ratio in the first direction is 50% and the threshold compensation ratio in the second direction is 50%, a total threshold compensation ratio may be determined as 25%, that is, the product of the threshold compensation ratios in the first direction and the second direction, but the present disclosure is not limited thereto.

The final threshold determination circuit 145-4 may determine the final threshold by compensating for a threshold based on a threshold compensation ratio.

The final threshold determination circuit 145-4 may use a threshold compensation ratio, which is obtained through the product of a threshold compensation ratio of the panel in the first direction, for example, in the x axis direction and a threshold compensation ratio of the panel in the second direction, for example, in the y axis direction, to calculate the final threshold.

When a calculated final threshold is smaller than a minimum threshold, the final threshold determination circuit 145-4 may determine the minimum threshold of the entire or some area as the final threshold.

Although a threshold before compensations is a given size, the touch control circuit 145 may obtain a dynamic threshold that differently sets a threshold for each location of a touch area through the offset determination circuit 145-2, the threshold compensation ratio determination circuit 145-3, and the final threshold determination circuit 145-4.

Figure 4:
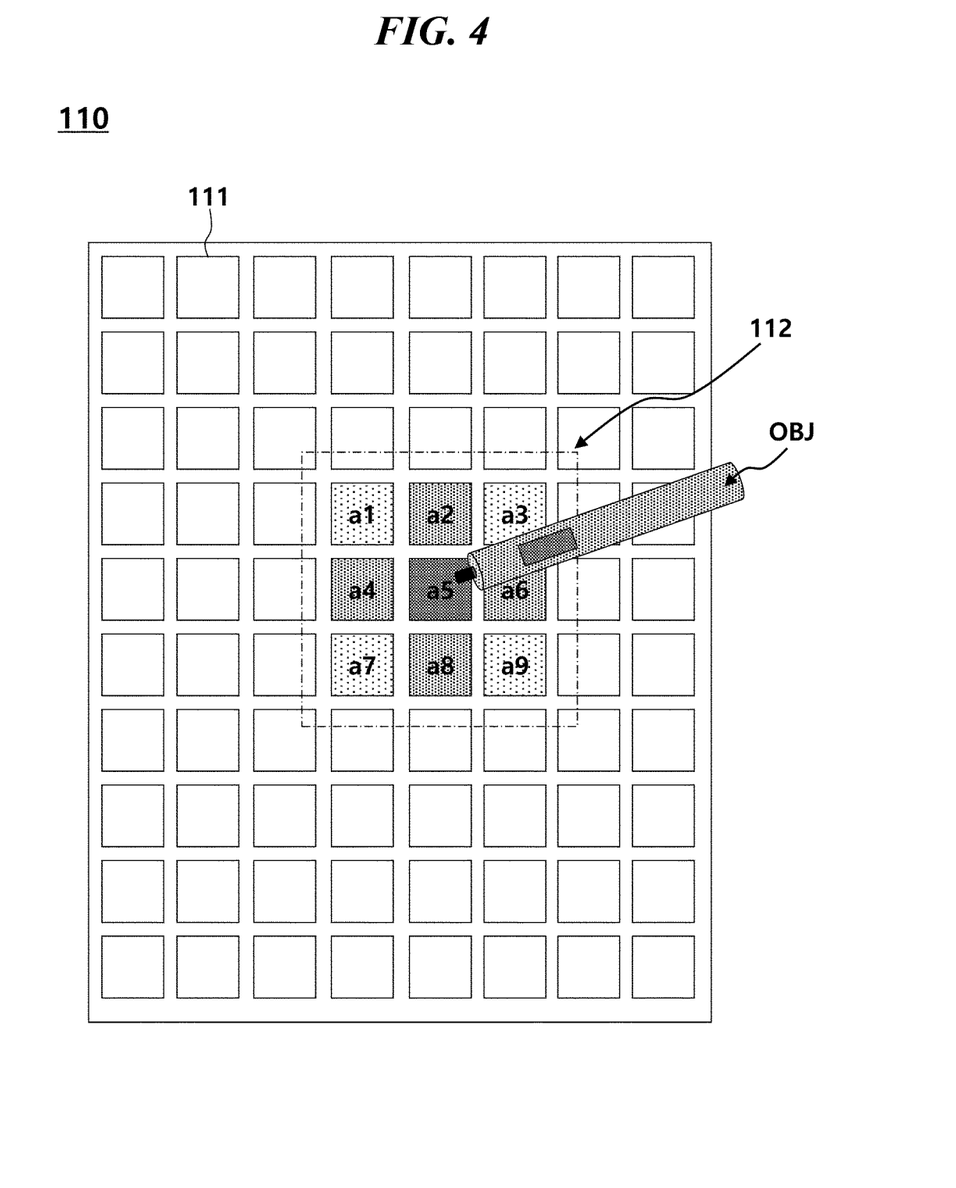
FIG. 4 is a diagram illustrating one touch area of a panel according to the present disclosure.

FIG. 4 is a diagram illustrating one touch area of a panel according to the present disclosure.

Referring to FIG. 4, the panel 110 may include a plurality of touch electrodes 111, etc.

A change in capacitance may occur in one or more touch electrodes 111 based on the touch or proximity of the object OBJ. The corresponding touch electrodes may be defined as a touch area 112.

The touch area 112 may be defined as a set of touch electrodes in which a change in capacitance has occurred or a set of touch electrodes in which a change in capacitance, which is equal to or greater than a threshold, has occurred.

The touch area 112 may include a first touch area a1, a second touch area a2, a third touch area a3, a fourth touch area a4, a fifth touch area a5, a sixth touch area a6, a seventh touch area a7, an eighth touch area a8, and a ninth touch area a9, for example.

When the object OBJ approaches the fifth touch area a5, a change in capacitance in each area may be different. For example, a change in capacitance in each of the second, fourth, sixth, and eighth touch areas a2, a4, a6, and a8 may be smaller than a change in capacitance in the fifth touch area a5. A change in capacitance in each of the first, third, seventh, and ninth touch areas a1, a3, a7, and a9 in each of corners of the touch area 112 may be the smallest.

For example, even though the touch area 112 is defined as an area having a minimum unit for touch sensing, although a touch input having the same size occurs, a change in capacitance may be smaller due to structural characteristics of a touch electrode. For example, a lower change in capacitance for a touch electrode that is disposed at the outskirts of the touch area not the center of the touch area may be obtained by considering a change in capacitance at a given ratio with respect to adjacent other touch areas (not illustrated).

In FIG. 4, the touch area 112 has been represented as a set of a plurality of touch electrodes, but the technical spirit of the present disclosure is not limited thereto. The touch area may include a touch on some area within one touch electrode.

Figure 5:
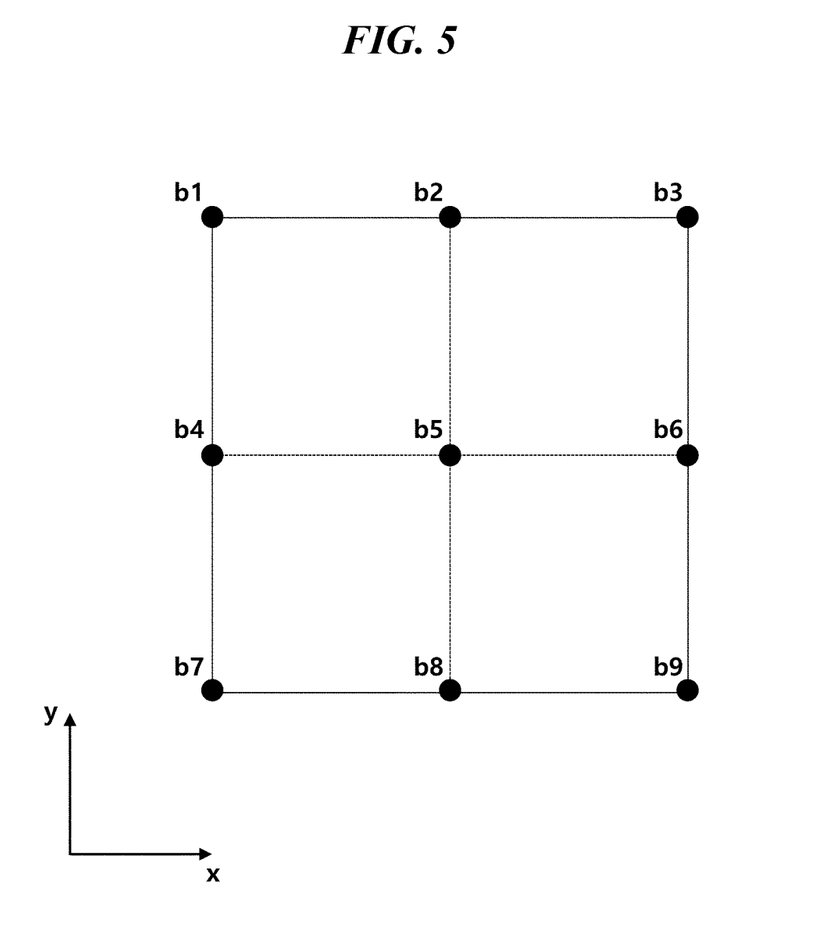
FIG. 5 is a diagram in which a touch area is implemented as a set of nodes according to the present disclosure.

FIG. 5 is a diagram in which a touch area is implemented as a set of nodes according to the present disclosure.

Referring to FIG. 5, a touch area may be constituted with a set of a plurality of nodes.

In this case, the nodes may correspond to touch electrodes, respectively, but may mean a given one point of one touch electrode. The touch area may include some or all of a plurality of nodes b1, b2, b3, b4, b5, b6, b7, b8, and b9.

The nodes that form the touch area may be defined by coordinate information in an x axis direction and a y axis direction. The nodes may generate touch data having different sizes although the nodes receive touch inputs having the same intensity.

The touch control circuit (not illustrated) may define, as one matrix, nine nodes in which a touch of an object has occurred, and may differently set thresholds for the nine nodes of the matrix. For example, the touch control circuit may set the threshold of a node at the center of the matrix so that the node has a maximum size, and may differentially decrease the threshold of a node based on the distance from the node at the center of the matrix.

The touch control circuit (not illustrated) may perform an operation of calculating a change in the touch sensitivity of the matrix in the x axis direction and a change in the touch sensitivity of the matrix in the y axis direction and updating the threshold of each node of the matrix based on the changes in the touch intensity in the x axis and y axis directions.

The touch control circuit (not illustrated) may determine a touch area based on some or all of nodes, may set a central part of the determined touch area as an offset location, and may differently set the size of a threshold for each location on the basis of the offset location. For example, if the second node b2, the third node b3, the fourth node b4, and the fifth node b5 have been defined as a touch area, the touch control circuit may determine the touch center in proportion to the touch intensity of each node, or may determine the fifth node b5, that is, the center of the matrix, as a center node, but the present disclosure is not limited thereto.

In FIG. 5, a central part of the nine nodes may be defined as the fifth node b5, but the present disclosure is not limited thereto.

Figure 6:
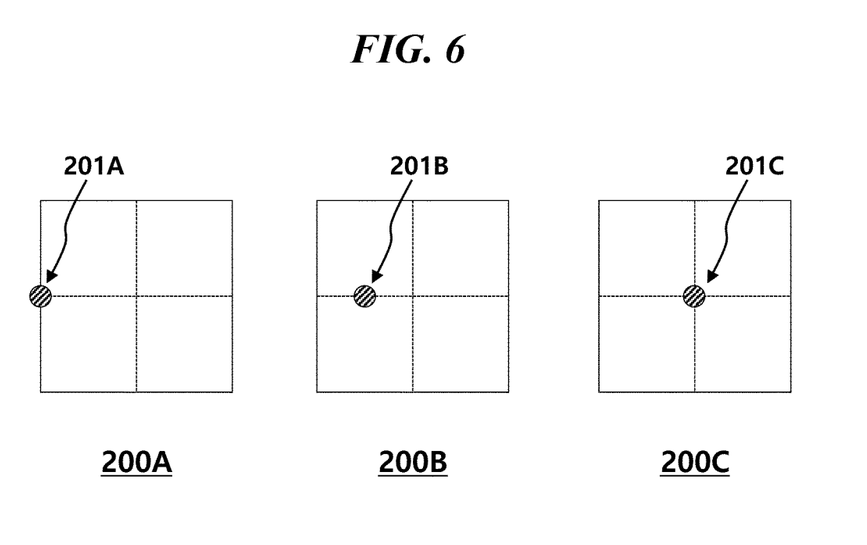
FIG. 6 is a diagram describing a touch data deviation for each touch location according to the present disclosure.

FIG. 6 is a diagram describing a touch data deviation for each touch location according to the present disclosure.

Referring to FIG. 6, touch data deviations for each touch location may be compared.

A first touch location 201A of a first matrix 200A corresponds to the outermost node of the first matrix. Touch data having the lowest intensity may be generated at the first touch location 201A.

Touch data that is equal to or greater than that of the first touch location 201A and that is smaller than that of a third touch location 201C may be generated at a second touch location 201B of a second matrix 200B.

The third touch location 201C of the third matrix 200C corresponds to a node at the central part of the third matrix 200C. Touch data having the highest intensity may be generated at the third touch location 201C.

As a touch location is changed from the first touch location 201A, that is, the outermost node, to the third touch location 201C, that is, the node at the central part, the size of the touch data may be increased, but the present disclosure is not limited thereto.

When a touch occurs in a small area, for example, a touch area implemented as nine nodes, touch data is increased toward the center of the nine nodes. Accordingly, a touch malfunction can be prevented and touch performance can be improved by setting a touch threshold by incorporating such a characteristic.

Figure 7:
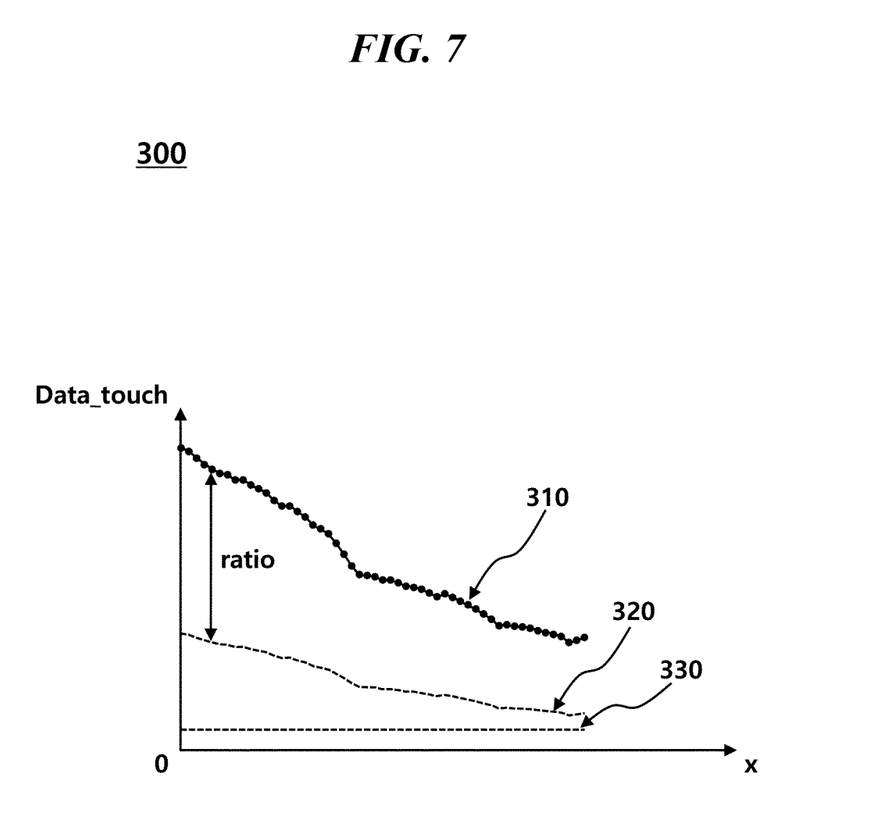
FIG. 7 is a first example diagram describing touch data and thresholds for each touch location according to the present disclosure.

FIG. 7 is a first example diagram describing touch data and thresholds for each touch location according to the present disclosure.

FIG. 7 may illustrate a graph 300 in which touch data and thresholds are compared for each touch location.

The readout circuit (not illustrated) of the display device may generate touch data corresponding to a change in capacitance of a touch electrode disposed in a panel. The touch control circuit (not illustrated) may determine that a touch for the panel has occurred when the touch data is equal to or greater than a threshold.

The touch control circuit (not illustrated) can improve touch performance by differently setting a threshold for each of locations of a plurality of touch electrodes or differently setting a threshold for each of a plurality of areas within one touch electrode.

The touch control circuit (not illustrated) may determine the size of a threshold based on a lookup table that is stored in a memory by previously measuring a touch intensity distribution of a touch area.

The touch control circuit (not illustrated) may perform an operation of changing the size of a threshold only when a touch area is less than a preset reference area and constantly maintaining the size of the threshold when the touch area is equal to or greater than the reference area. Since a relatively small touch signal may be sensed in a small touch area equal to or smaller than a reference area, it is necessary to improve the accuracy of touch sensing by changing the size of a threshold.

A first graph 310 may be a distribution of touch data that has been obtained by providing a touch area with the same touch intensity, for example, touch intensity obtaining by identically maintaining the interval between a panel and an object and changing only a location of the object. The first graph 310 may a distribution in which a value of the touch data has a maximum value when x coordinates are 0 and a value of the touch data is decreased as the x coordinates are increased.

A second graph 320 may be a graph illustrating a distribution of thresholds for identifying a touch. As the x coordinates are changed, the threshold may be changed, and the second graph 320 may have a given ratio with respect to the first graph 310.

In the second graph 320, the threshold has a given proportional relation with the previously obtained touch intensity graph, and may incorporate panel characteristics of a corresponding area.

The touch control circuit (not illustrated) may obtain an updated threshold, for example, the second graph 320 by measuring touch intensity for each location of a touch electrode, for example, the first graph 310 and updating a threshold for each location of a touch electrode so that a threshold that previously has a given size, for example, a threshold corresponding to a third graph 330 corresponds to maximum touch intensity.

The third graph 330 may be defined as a graph in which thresholds for identifying a touch are the same.

Figure 8:
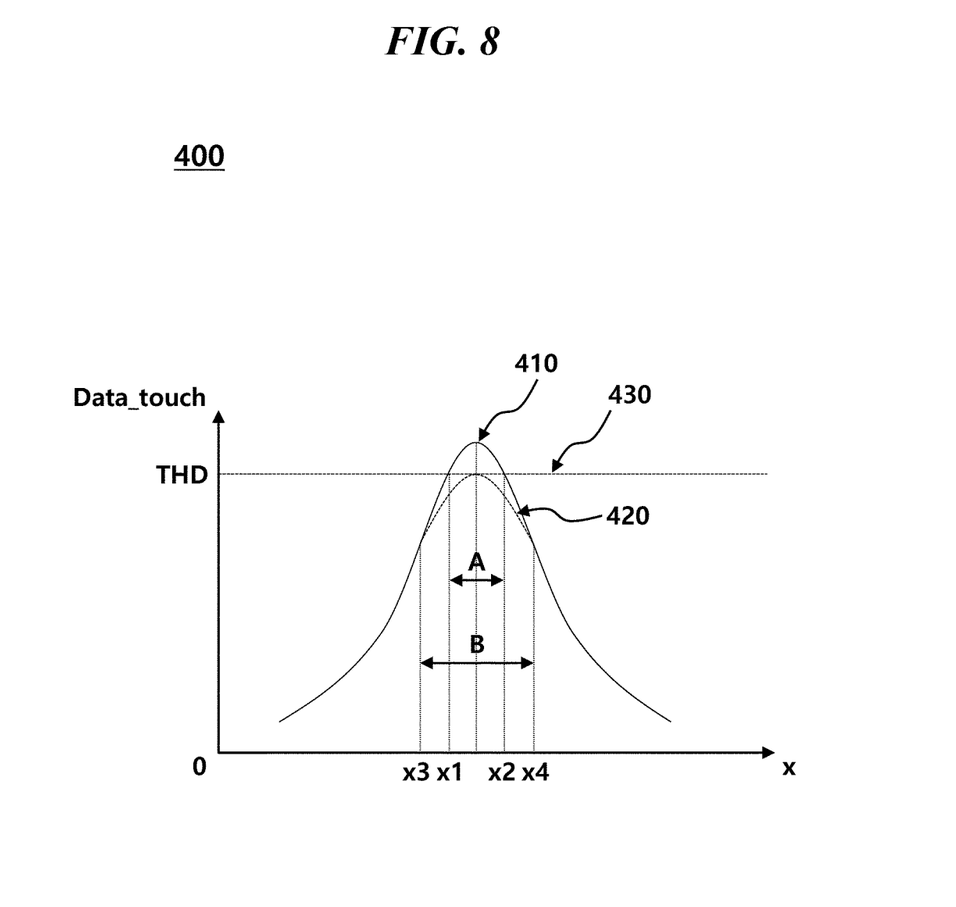
FIG. 8 is a second example diagram describing touch data and thresholds for each touch location according to the present disclosure.

FIG. 8 is a second example diagram describing touch data and thresholds for each touch location according to the present disclosure.

FIG. 8 may illustrate a graph 400 in which touch data and thresholds are compared for each touch location.

A first graph 410 is a graph illustrating a change in touch data for each location. The graph may have maximum touch data at a given point and may have a Gaussian distribution, but the present disclosure is not limited thereto.

A second graph 420 is a graph having dynamic thresholds, and illustrates a case where thresholds for each location are differently set.

A third graph 430 is a graph having a fixed threshold, and illustrates a case where a threshold for each location is identically maintained.

If the third graph 430 is applied to the touch circuit (not illustrated), touch data in an interval A (x1 to x2) that is equal to or greater than a threshold having a given size may be recognized as a valid touch.

In contrast, if the second graph 420 is applied to the touch circuit (not illustrated), an interval B (x3 to x4) that is equal to or greater than a threshold is also changed because the size of the threshold is changed. In this case, touch data by which a touch has not been sensed may be recognized because touch data equal to or smaller than the threshold THD of the third graph is present between x3 and x1 or between x2 and x4.

FIG. 8 is for describing a change in touch sensing according to a threshold for each location, and the present disclosure is not limited to the above description.

Figure 9:
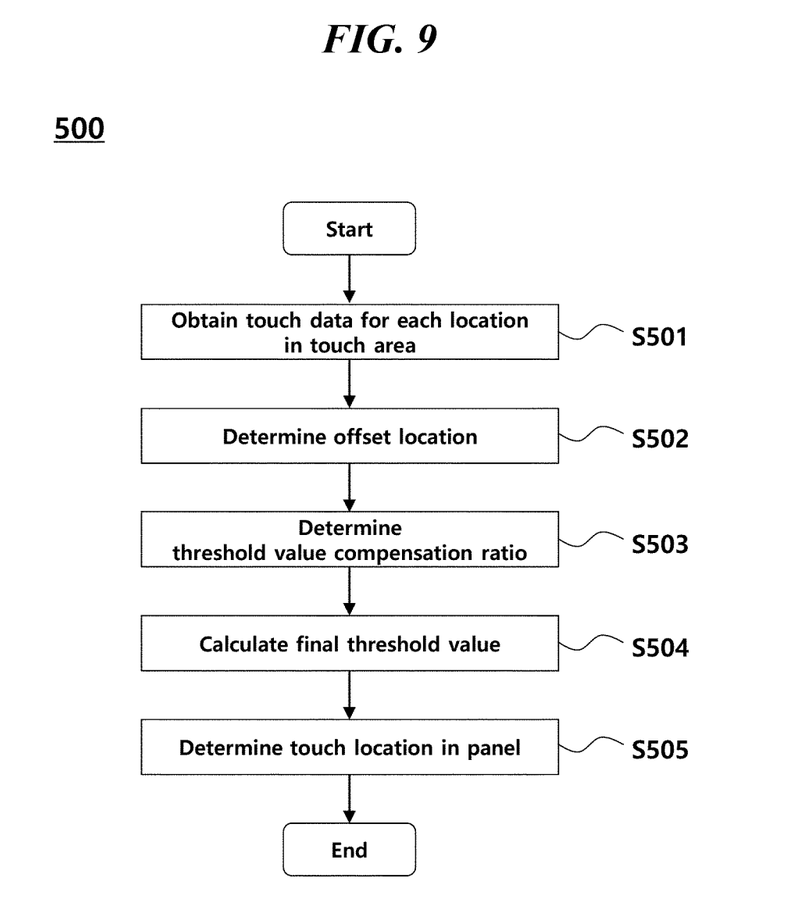
FIG. 9 is a first example flowchart illustrating a touch sensing method according to the present disclosure.

FIG. 9 is a first example flowchart illustrating a touch sensing method according to the present disclosure.

Referring to FIG. 9, a touch sensing method 500 according to the present disclosure may include step S501 of obtaining touch data for each location of a touch area, step S502 of determining an offset location, step S503 of determining a threshold compensation ratio, step S504 of calculating the final threshold, and step S505 of determining a touch location in the panel.

Step S501 of obtaining touch data for each location of a touch area may be a step of obtaining touch data for each location of one touch area of a panel and storing the touch data in a form, such as a lookup table.

The touch data includes x axis touch data and y axis touch data. Each of the x axis data and the y axis data may be stored and managed as a separate lookup table.

Step S502 of determining an offset location may be a step of determining an offset location in an area in which a touch event is determined to have occurred. The offset location may be set on the basis of various criteria, such as that the offset location is determined on the basis of a touch electrode or determined on the basis of the intensity of a touch signal.

For example, the offset location may be determined as a central part of a touch area.

In step S503 of determining a threshold compensation ratio, a change in touch data for each distance may be calculated on the basis of the size of touch data of the offset location and the offset location. A ratio corresponding to a change in the touch data for each distance may be determined as the threshold compensation ratio.

For example, the threshold compensation ratio may be determined by multiplying the size of touch data for each distance by a given proportional constant on the basis of the offset location.

The threshold compensation ratio may be determined by multiplying ratios of touch data in the x axis and y axis directions compared to touch data at the central part of the touch area.

Step S504 of calculating the final threshold may be a step of calculating the final threshold by applying the threshold compensation ratio to a preset threshold.

For example, the preset threshold may be a threshold having a given size, but the present disclosure is not limited thereto. A threshold having a new spectrum may be obtained by updating a variable threshold again.

The final threshold may have a maximum value at the central part of the touch area, and may have a minimum value at an outermost part as the final threshold becomes more distant from the central part, but the present disclosure is not limited thereto. The final threshold may be determined based on a distribution of touch data.

Step S505 of determining a touch location in the panel may be a step of determining whether a touch of an object for the panel has occurred based on the final threshold. Characteristics for each location can be incorporated and touch performance can be improved by changing the size of a threshold for each location of the panel based on the final threshold.

Figure 10:
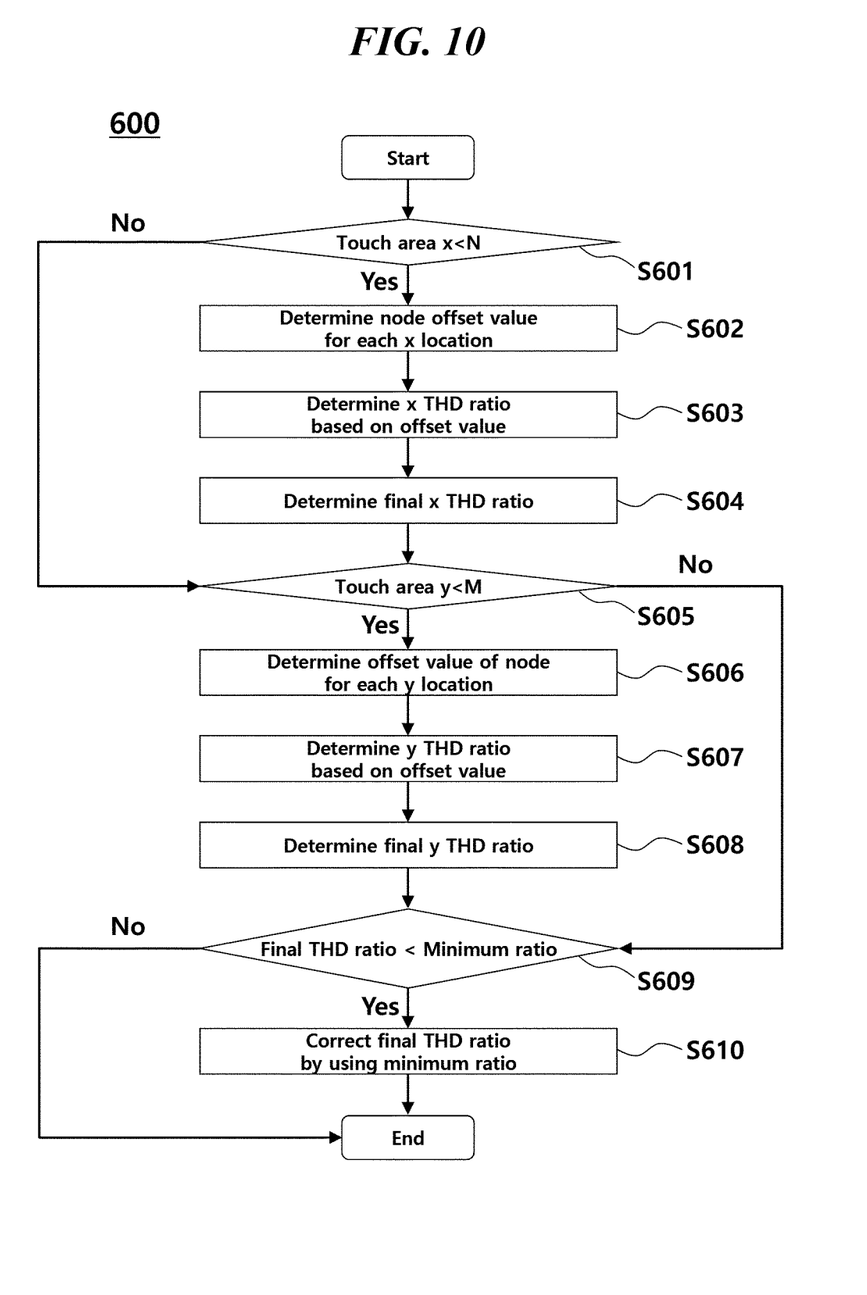
FIG. 10 is a second example flowchart illustrating a touch sensing method according to the present disclosure.

FIG. 10 is a second example flowchart illustrating a touch sensing method according to the present disclosure.

Referring to FIG. 10, a touch sensing method 600 may include step S601 of determining a touch size in an x axis direction, step S602 of determining a node offset value for each location in the x-axis direction, step S603 of determining a threshold compensation ratio in the x axis direction, step S604 of determining the final threshold ratio in the x axis direction, step S605 of determining a touch size in a y axis direction, step S606 of determining a node offset value for each location in the y axis direction, step S607 of determining a threshold compensation ratio in the y axis direction, step S608 of determining the final threshold ratio in the y axis direction, step S609 of comparing the final threshold and a minimum threshold, and step S610 of correcting the final threshold.

Step S601 of determining a touch size in an x axis direction may be a step of determining a touch size in an x axis direction of a touch area. A criterion for the touch size in the x axis direction may be N (N is an integer greater than or equal to 1), but the present disclosure is not limited thereto. For example, a criterion for a small touch may be defined by setting the criterion for the touch size in the x axis direction as 3.

Step S602 of determining a node offset value for each location in the x-axis direction may be a step of determining an offset location of a node on the basis of a location of the node in the x-axis direction and determining touch data of the offset location.

Step S603 of determining a threshold compensation ratio in the x axis direction may be a step of obtaining a touch data distribution for each location in the x axis direction on the basis of the offset location and the touch data of the offset location and determining a threshold compensation ratio in the x axis direction.

For example, a threshold compensation ratio in a +x axis direction may be determined on the basis of a change in the touch data of an offset location in the +x axis direction. A threshold compensation ratio in an −x axis direction may be determined on the basis of a change in touch data of the offset location in the −x axis direction. A threshold compensation ratio for each location may be determined by multiplying a touch data distribution for each location by a given proportional constant.

Step S604 of determining the final threshold ratio in the x axis direction may be a step of determining the final threshold ratio in the x axis direction by incorporating the threshold compensation ratio on the basis of the existing threshold ratio.

Step S605 of determining a touch size in a y axis direction may be a step of determining the touch size of the touch area in a y axis direction. A criterion for the touch size in the y axis direction may be M (M is an integer greater than or equal to 1), but the present disclosure is not limited thereto. For example, the criterion for a small touch may be defined by setting the criterion for the touch size in the y axis direction as 3.

Step S606 of determining a node offset value for each location in they axis direction may be a step of determining an offset location of a node on the basis of a location of the node in the y-axis direction and determining touch data of the offset location.

Step S607 of determining a threshold compensation ratio in they axis direction may be a step of obtaining a touch data distribution for each location in the y axis direction on the basis of the offset location and the touch data of the offset location and determining a threshold compensation ratio in the y axis direction the.

For example, a threshold compensation ratio in a +y axis direction may be determined on the basis of a change in the touch data of an offset location in the +y axis direction. A threshold compensation ratio in a −y axis direction may be determined on the basis of a change in touch data of the offset location in the −y axis direction. A threshold compensation ratio for each location may be determined by multiplying a touch data distribution for each location by a given proportional constant.

Step S608 of determining the final threshold ratio in they axis direction may be a step of determining the final threshold ratio in the y axis direction by incorporating the threshold compensation ratio on the basis of the existing threshold ratio.

Step S609 of comparing the final threshold and a minimum threshold may be a step of calculating the final threshold or the final threshold ratio by multiplying the final threshold or the final threshold ratio in the x axis direction and the final threshold or the final threshold ratio in the y axis direction and comparing the final threshold or the final threshold ratio and a minimum threshold or a minimum threshold ratio.

In the process of calculating the final threshold or the final threshold ratio, the final threshold or the final threshold ratio in the x axis direction and the final threshold or the final threshold ratio in the y axis direction are independently performed. Accordingly, three-dimensional data may not be integrated and managed, and the amount of data stored and a computation load for data can be reduced.

When the final threshold or the final threshold ratio is smaller than the minimum threshold or the minimum threshold ratio, step S610 of correcting the final threshold may be performed.

Step S610 of correcting the final threshold may be a step of correcting the final threshold value by using a preset minimum threshold when the final threshold is smaller than the minimum threshold. A reduction in the final threshold can be maintained through such a step.

Some of the steps of the touch sensing method 600 in FIG. 10 may be omitted, or the order of some of the steps may be changed, and the technical spirit of the present disclosure is not limited thereto.

It will be apparent to those skilled in the art that various modifications and variations can be made in the touch control circuit and a display device including the same of the present disclosure without departing from the spirit or scope of the aspects. Thus, it is intended that the present disclosure covers the modifications and variations of the aspects provided they come within the scope of the appended claims and their equivalents.

What is claimed is:

1. A touch control circuit comprising:
   a touch detection circuit configured to determine that a touch for a panel is occurred when a change in capacitance of each location of a touch electrode disposed in the panel is equal to or greater than a threshold;
   an offset determination circuit configured to determine an offset location among locations at which the touch has occurred;
   a threshold compensation ratio determination circuit configured to obtain a threshold compensation ratio for each distance based on the offset location; and a final threshold determination circuit configured to determine a final threshold by compensating for the threshold based on the threshold compensation ratio, wherein the touch detection circuit is further configured to determine whether the touch has occurred and a touch location of the panel based on the final threshold, and wherein the touch detection circuit is further configured to differently set a threshold in a ground state of a display device and a threshold in a non-ground state of the display device.

2. The touch control circuit of claim 1, wherein the touch detection circuit is further configured to store the thresholds in separate lookup tables.

3. The touch control circuit of claim 1, wherein the offset determination circuit is further configured to determine a touch area based on a touch location and determines a central part of the touch area as an offset location.

4. The touch control circuit of claim 1, wherein the offset determination circuit is further configured to determine, as the offset location, a central part of each of a plurality of touch electrodes disposed in the panel.

5. The touch control circuit of claim 1, wherein the threshold compensation ratio determination circuit is further configured to determine a touch intensity distribution for each location based on the offset location and determine the threshold compensation ratio corresponding to the touch intensity distribution for each location.

6. The touch control circuit of claim 1, wherein the threshold compensation ratio determination circuit is further configured to calculate a threshold compensation ratio of the panel in a first direction and a threshold compensation ratio of the panel in a second direction.

7. The touch control circuit of claim 1, wherein the final threshold determination circuit is further configured to calculate the final threshold as a product of a threshold compensation ratio of the panel in a first direction and a threshold compensation ratio of the panel in a second direction.

8. The touch control circuit of claim 1, wherein the final threshold determination circuit is further configured to determine a preset minimum threshold as the final threshold when the final threshold is smaller than the minimum threshold.

* * * * *